(No Model.)
J. F. QUINN & R. E. LEE.
FLUE WELDING MACHINE.
No. 595,836. Patented Dec. 21, 1897.
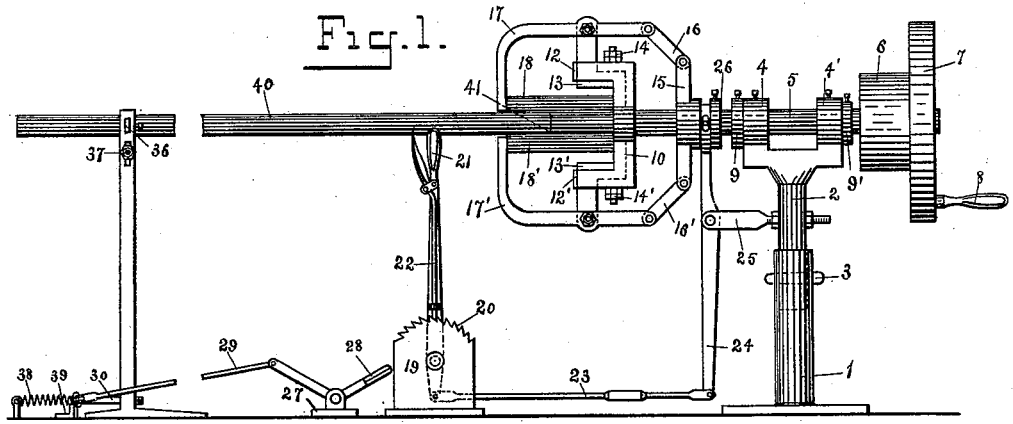
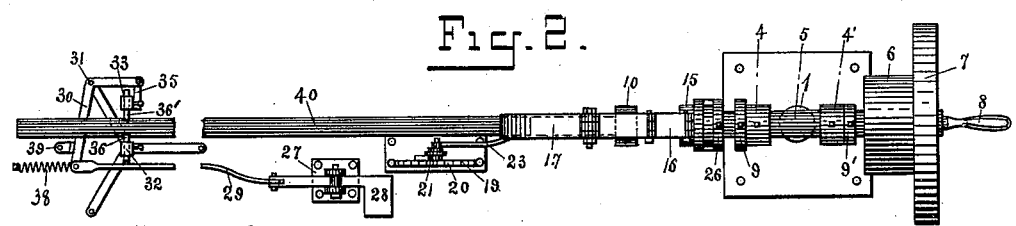
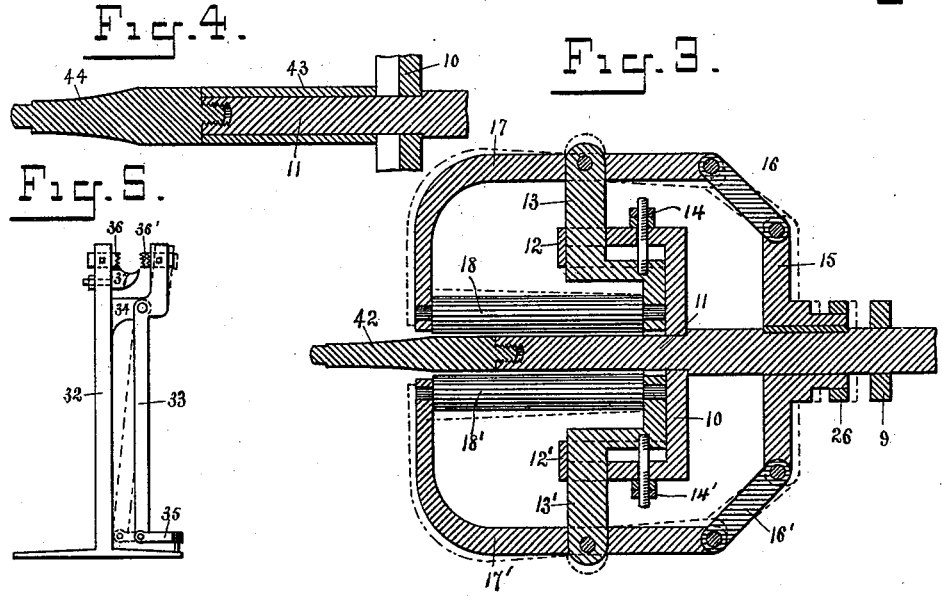
Witnesses
Jno. F. Fletcher
R. A. McAdory
Inventors
J. F. Quinn
R. E. Lee
By their Attorney P. Byrne

United States Patent Office.

JAMES F. QUINN AND ROBERT E. LEE, OF BIRMINGHAM, ALABAMA.

FLUE-WELDING MACHINE.

SPECIFICATION forming part of Letters Patent No. 595,836, dated December 21, 1897.

Application filed May 26, 1897. Serial No. 638,241. (No model.)

*To all whom it may concern:*

Be it known that we, JAMES F. QUINN and ROBERT E. LEE, citizens of the United States, residing at Birmingham, in the county of Jefferson and State of Alabama, have invented certain new and useful Improvements in Flue-Welding Machines; and we do hereby declare the following to be a full, clear, and exact description of the invention, such as will enable others skilled in the art to which it appertains to make and use the same.

Our invention relates to improvements in flue-welding machines in which rollers operate in conjunction with a mandrel; and the objects of our improvement are, first, to provide a tube-welding machine of a simple and cheaply-constructed form, the machine adapted to be operated by hand or by power, as desired; second, to provide a rotating mandrel inside the tube and two rotating rollers on the outside of the tube to operate on the part to be welded; third, to provide a machine for welding tubes having an adjustable mandrel and adjustable rollers by which a change can be readily made to adapt the machine for welding tubes of various diameters. We attain these objects by the mechanism illustrated in the accompanying drawings, in which—

Figure 1 is a vertical side view of our improved tube-welding machine. Fig. 2 is a top or plan view of the same. Fig. 3 is an enlarged detail vertical sectional view of the rotating head through the center. Fig. 4 is a detail vertical sectional view of the mandrel, showing its adjustment to a larger diameter. Fig. 5 is a vertical front view of the tube-vise.

Similar numerals refer to similar parts throughout the several views.

The base or pedestal 1 is made with a flanged bottom to adapt the same to be secured to the floor. The head of the pedestal is formed hollow to receive the stem of the column 2, the column and pedestal being secured together by the key 3. The head of the column is provided with two shaft-bearings 4 4', the bearings made in the usual form.

The main shaft 5 is made of suitable material of the usual form. The shaft is journaled in the bearings formed on the head of the column. The outer end of the shaft has a belt-pulley 6 mounted thereon to operate the shaft by power. The balance-wheel 7, mounted on the shaft, is provided with a handle 8 to operate the shaft by hand, if desired. Two collars 9 9' are secured on the shaft to hold the same into place in the bearings.

The head 10 is rigidly attached to the main shaft near its inner end. The shaft extends some distance beyond the head to form the mandrel 11. The head consists of a transverse beam having horizontal arms 12 12', extending at right angles from the ends thereof. The head is recessed to receive adjustable bearing-blocks 13 13'. The bearing-blocks are adjusted and secured to the head by the studs 14 14', having jam-nuts provided thereon.

The sliding head 15 is mounted on the shaft. The head consists of a transverse beam attached to a hub, the hub adapted to slide on the shaft. Two links 16 16' connect the outer ends of the head with two rock-lever arms 17 17'. The rock-lever arms are journaled near their centers to the heads of the adjustable bearing-blocks 13 13'. Two rollers 18 18' are journaled at their back ends in the lever-arms 17 17'. The rollers are journaled at their front ends in the bearing-blocks 13 13'. The lever-arms when operated by the sliding head will press the back end of the rollers against the mandrel or withdraw them therefrom, as desired. The front end of the rollers are adjusted by the bearing-blocks 13 13' to any position desired.

The stand 19 is provided with a bottom flange to adapt it to be secured to the floor. A bifurcated bearing extends upward from the base. One side of the bearing is provided with a notched segment 20. A hand-lever 21 is journaled in the stand, the lever having the usual form of spring-catch 22 to engage the notch-segment. The connecting-rod 23 connects the hand-lever with a vertical rock-lever 24. The rock-lever is journaled in a bearing 25, the bearing adjustably attached to the column 2. The rock-lever head is forked in the usual manner to engage the hub of the sliding head 15, the collar 26 being attached to the hub to hold the forked head to place. The rock-lever, if operated by the hand-lever 21, slides the head 15 on the shaft in reverse directions, as desired.

The stand 27 is flanged at the bottom to adapt it to be secured to the floor. A foot-lever 28 is journaled therein. The connecting-rod 29 connects the foot-lever with a bell-crank lever 30, the bell-crank lever being journaled at the angle 31 in the usual manner.

The vertical vise-stand 32 is attached to the floor in any desired manner. A pivoted jaw 33 is journaled to a bracket 34, formed on the stand. The lower end of the pivoted jaw is connected to the bell-crank lever by a link 35. The heads of the vise-stand are mortised to receive two vise-grips 36 36'. An adjustable bearing 37 is also attached to the stand. The coiled spring 38 is attached to the bell-crank lever to pull it back when the foot is removed from the lever, and the stop 39 is provided to control the backward movement of the same.

A boiler-tube 40, of the usual form, is shown engaged in the vise. The opposite end of the tube is shown on the mandrel in the position for welding, the weld being represented at 41. The mandrel 11 has a taper end 42 attached to main mandrel by screw-threads. If desired to enlarge the mandrel, the taper end is removed and a collar 43 slipped over the mandrel, as shown in Fig. 4. An enlarged end 44 is then attached. The welding-rollers are adjusted to correspond, which adapts the machine to weld tubes of various diameters.

In operation the tube when heated is placed in the machine, as shown, and the back end of the tube securely grasped by the vise. The main shaft carrying the head being put in rotation by any desired means the hand-lever 20 is operated to bring the welding-rollers 18 18' to press on the tube and form the weld by rolling round the outside thereof.

Having thus described our invention, what we claim as new, and desire to secure by Letters Patent, is—

1. The rotatory shaft secured in bearings attached to the head of a stand, the fixed head attached to the shaft, the end of the shaft extending beyond the head to form a mandrel, two adjustable bearing-blocks attached to the head, two rock-lever arms journaled in the heads of the bearing-blocks, two links connecting the arms with a sliding head, mounted on the rotatory shaft, two welding-rollers journaled at one end in the rock-lever arms, the opposite end of the rollers journaled in the adjustable bearing-blocks, and means to rotate the shaft, substantially as and for the purpose described.

2. The rotatory shaft secured in bearings attached to a stand, the fixed head attached to the shaft, the end of the shaft extended beyond the head to form a mandrel, the removable end attached to the mandrel, the removable collar, and the enlarged mandrel end, in combination with the welding-rollers journaled in a revolving head, substantially as described.

3. The rotatory shaft secured in bearings attached to the head of a stand, the fixed head attached to the rotatory shaft, the head carrying two adjustable bearing-blocks, two rock-lever arms journaled in the heads of the bearing-blocks, two rollers journaled at one end in the rock-lever arms, the opposite ends of the rollers journaled in the bearing-blocks, two links pivotally connecting the rock-lever arms with a sliding head, the sliding head mounted on the rotatory shaft and operated by a hand-lever, substantially as and for the purpose described.

4. The foot-lever journaled in the stand, the connecting-rod connecting the foot-lever to the bell-crank lever, the bell-crank lever connected to the pivoted jaw of the tube-vise, the spring connected to the bell-crank lever, and the stop to control the movement of the bell-crank lever, substantially as and for the purpose described.

In testimony whereof we affix our signatures in presence of two witnesses.

JAMES F. QUINN.
ROBERT E. LEE.

Witnesses:
W. T. ROBINSON,
P. K. McMILLER.